Patented Dec. 18, 1928.

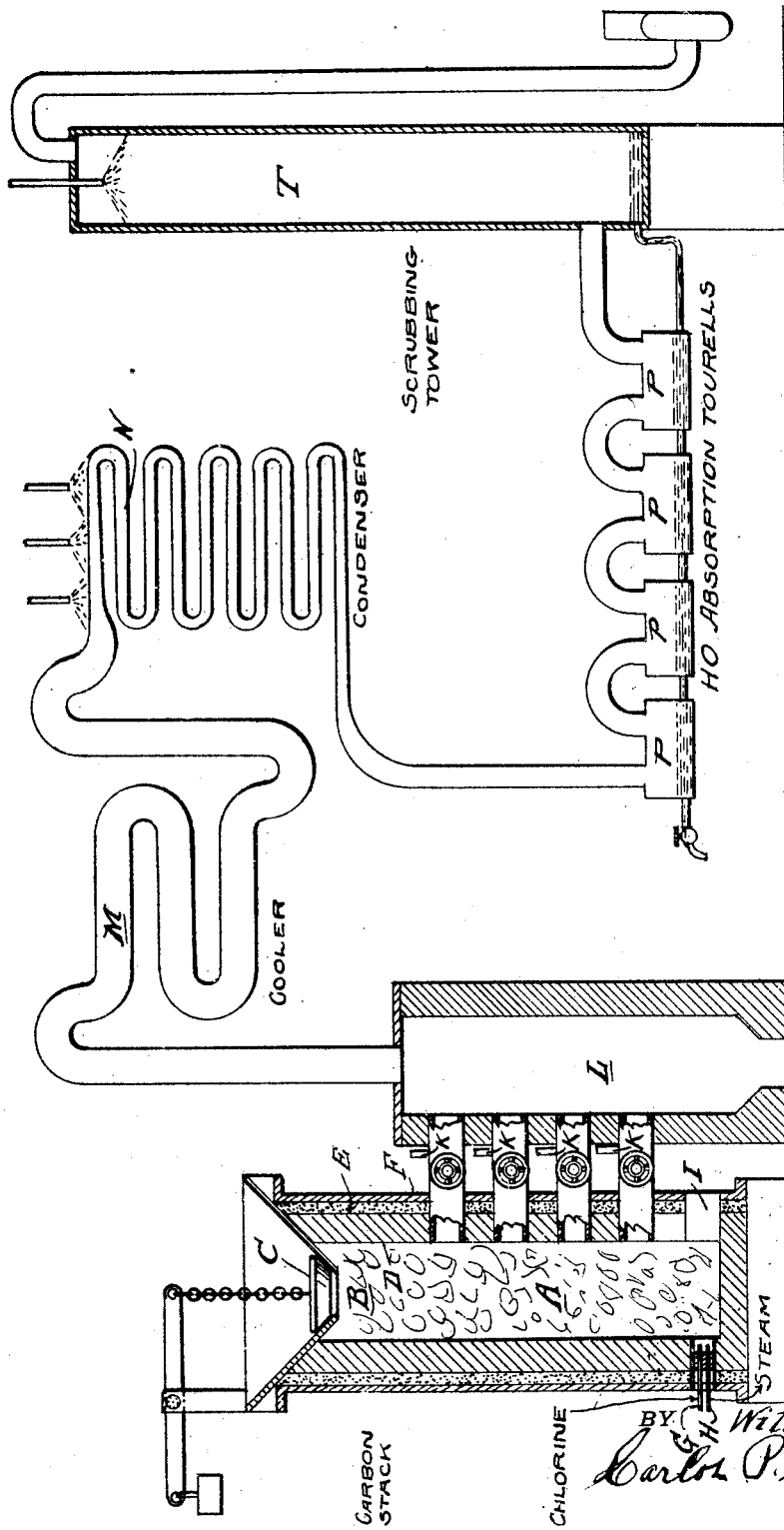

1,695,552

UNITED STATES PATENT OFFICE.

WILHELM HIRSCHKIND, OF ANTIOCH, AND CARL W. SCHEDLER, OF BERKELEY, CALIFORNIA, ASSIGNORS TO GREAT WESTERN ELECTRO CHEMICAL COMPANY, OF SAN FRANCISCO, CALIFORNIA, A CORPORATION OF CALIFORNIA.

PROCESS OF PRODUCING HYDROCHLORIC ACID SYNTHETICALLY.

Application filed September 14, 1925. Serial No. 56,376.

This invention relates to the production of hydrochloric acid from chlorine and steam, with the aid of carbon. It is an improvement over the process described and claimed in United States Patent No. 1,485,816, dated March 4th, 1924.

It will be understood by those skilled in the art, that in the electrolytic production of caustic soda from salt, large quantities of chlorine are produced, and that in most instances the quantity of caustic soda, which can be produced, is limited by the possible economic use of the chlorine produced coincident therewith.

This process, therefore, is intended to provide an additional outlet for such chlorine, by taking advantage of the following reaction:

(1) $2Cl_2 + 2H_2O + C = 4HCl + CO_2$

This reaction, as will be readily understood by those skilled in the art, is strongly exothermic, 17000 calories being liberated per mol of hydrochloric acid produced.

Some investigators claim that the reaction between carbon, chlorine and steam, takes place in accordance with the equation:

(2) $Cl_2 + H_2O + C = 2HCl + CO$

While this reaction (2) is also exothermic the heat liberated is but 7500 calories per mol of hydrochloric acid produced. Because of the lesser heat of reaction the process cannot be carried on in accordance with the equation (2) without supplementary heating which complicates the process.

It has been believed for instance that excess steam would have no other effect than to reduce the reaction temperature and to serve as an absorption medium for the hydrochloric acid gas formed.

The influence of an excess of other constituents also appears not to have been clearly recognized by previous investigators.

Our investigations have proven that while the reaction can in the end be made to conform to either of the above equations, it is preferable to conform to No. (1) and that the reaction actually takes place in two steps as follows:—

$$C \text{ (heated)} + H_2O = H_2 + CO$$
$$H_2 + CO + 2Cl_2 + H_2O = 4HCl + CO_2$$

The first reaction, the well-known water gas reaction, is endothermic while the latter is exothermic. By properly balancing these two reactions through control of steam, chlorine and carbon, the process can be operated smoothly without overheating and with practically no Cl in the exit gas. If, however, there be an excess of steam introduced into the reaction chamber, then the water gas reaction will predominate; there will then be a considerable quantity of hydrogen and carbon monoxide in the exit gases, and, because the endothermic reaction predominates, the furnace will tend to cool off. If again there is an excess of carbon present, thereby tending to conform with equation No. 2, the $CO_2$ normally present in the exit gases will be reduced to carbon monoxide according to the following equation: $CO_2 + C = 2CO$ but there will be no free hydrogen present. The endothermic reduction of $CO_2$ to CO likewise tends to cool off the furnace.

Since both hydrogen and carbon monoxide are combustible, their presence, or the presence of either of them, in the exit gases, renders the carrying out of the process more or less dangerous, because of the possibility of explosions. Also, any departure from these proportions of chlorine, carbon and steam, which will balance the reaction in accordance with the equation originally stated, will decrease the HCl gas concentration in the exit gases and render the absorption of this gas more difficult, and seriously interfere with the most efficient and proper operation of this process.

Our investigations have shown that, when the reaction zone contains 12 to 14 cubic feet of properly heated carbon, about 200 lbs., of 80 to 90 percent chlorine gas per hour will produce an 80 to 85 percent HCl gas for absorption. The temperature of the escaping gases is a function of the heat balance of the two reactions and the radiation losses.

The furnace should be so designed that radiation losses will, at the proper operating temperature, balance the heat of reaction.

Our investigations have shown us that the process runs most smoothly with the exit gas temperature between 800 to 1000 degrees centigrade. It is possible to run with the exit gases at a temperature as low as 600 degrees centigrade, but below that temperature it is difficult to maintain the reaction without outside heat, and much of the simplicity and economy of the process will be lost if outside heating becomes necessary.

To summarize, it can be stated, that in carrying out the process, two conditions must be fulfilled:

First. The ratio of steam to chlorine must be very nearly the one required by the equation originally stated herein.

Second. The height and volume of the layer of carbon, must bear a definite relationship to the rate at which chlorine and steam are fed into the furnace.

The details of the process will be more clearly understood from the following description, and attached drawing.

The apparatus consists of a stack or shell "F" suitably heat insulated by means of lining "E", and having an inner lining of refractory material "D". Provision is made for the feeding of carbon through the plug "C"; the chlorine and steam are admitted through inlets "G" and "H", respectively, while inlet "I" is provided for air blast in starting. The interior of the furnace may be divided into two zones—"A", the reaction zone, and "B", the zone for storage and preheating of carbon. The exit gases, from the reaction zone "A", pass through exit pipes having therein thermometers "K", to chamber "L", thence through air cooled condenser "M" to water cooled condenser "N", from which the cooled gas passes through standard and well known absorption tourells "P", and scrubbing tower "T".

In order to start reaction, a fire is started in reaction zone "A", plug "C" is removed and carbon introduced on top of the fire through the opening in the top of the furnace, while an air blast enters through opening "I". As soon as the carbon in the furnace has been brought to a bright red heat, the air blast is shut off, plug "C" replaced, and chlorine and steam introduced through inlets "G" and "H".

By keeping a close watch upon the escaping gas the character of the reaction taking place will be known, and if the tendency is for the production of hydrogen and carbon monoxide showing predominance of the water gas reaction, the steam supply is diminished until the CO practically disappears.

If there is CO and no hydrogen in the exit gases from the furnace, an excess of carbon is indicated, and a lower outlet in the side of the furnace is used.

If there be $H_2O$ and $Cl_2$ both present in the exit gases a deficiency of carbon is indicated and a higher outlet is used; if there be free $Cl_2$ present without $H_2O$ then cut down the $Cl_2$ supply.

In this way the apparatus can be made adaptable to various rates of production and the two phases of the primary reaction continuously maintained in balance at proper temperature.

In actual practice it is found that if more carbon is required more is dropped in through the valve C. If less carbon is required to effect the desired reaction a lower one of the exits is used until the quantity of carbon is burned down and actually lowered at its uppermost layer, whereupon a higher gas outlet is made use of to keep the quantity of carbon at the proper amount to produce the desired reaction.

What we claim is as follows, but modifications may be made in the above particular described form of the invention within the purview thereof:

1. A process of producing hydro-chloric acid synthetically from chlorine which comprises passing steam and chlorine through hot carbon in approximately the ratio required to balance the equation $$C + 2H_2O + 2Cl_2 = 4HCl + CO_2$$

the gas being passed through an increased or diminished quantity of carbon to prevent the production of hydrogen and carbon monoxide.

2. A process of producing hydrochloric acid synthetically from chlorine which comprises passing steam and chlorine through hot carbon at approximately the ratio required to balance the equation $$C + 2H_2O + 2Cl_2 = 4HCl + CO_2$$

the gas being passed through a lesser quantity of carbon if carbon monoxide appears in the product, and through a greater quantity of carbon if hydrogen appears in the product.

3. A process of producing hydrochloric acid synthetically which comprises passing steam and chlorine through a receptacle containing hot carbon at approximately the ratio required to balance the equation $$C + 2H_2O + 2Cl_2 = 4HCl + CO_2$$

and increasing the quantity of carbon through which the gases pass if the quantity of hydrogen tends to increase, while diminishing the quantity of carbon through which the gas is passed if carbon monoxide appears in the discharge.

4. The process of producing hydrochloric acid which consists in passing chlorine and steam through hot carbon in substantially the ratio required to balance the equation $$C + 2H_2O + 2Cl_2 = 4HCl + CO_2$$

and at the same time controlling the quantity of carbon present in the reaction zone so as to produce hydrochloric acid substantially free from carbon monoxide or hydrogen, thereby balancing the exothermic and endothermic reactions so as to require neither additional heating nor cooling of the furnace during the time the reaction takes place.

5. A process of producing hydrochloric acid which consists in passing chlorine and steam through hot carbon in substantially the ratio required to balance the equation $$C + 2H_2O + 2Cl_2 = 4HCl + CO_2$$

and then increasing or diminishing the carbon present to eliminate as far as possible the production of CO and H.

6. The process of producing hydrochloric acid which consists in passing chlorine and steam through hot carbon in substantially the ratio to balance the equation, $$C + 2H_2O + 2Cl_2 = 4HCl + CO_2$$

and maintaining in the reaction zone a ratio of carbon of not less than 7, nor more than nine cubic feet per hundred pounds of chlorine passing into the reaction zone.

In testimony whereof we have hereunto set our hands.

WILHELM HIRSCHKIND.
CARL W. SCHEDLER.